July 22, 1941.   B. C. PLACE   2,249,910
SEPARABLE FASTENER
Filed Feb. 16, 1938
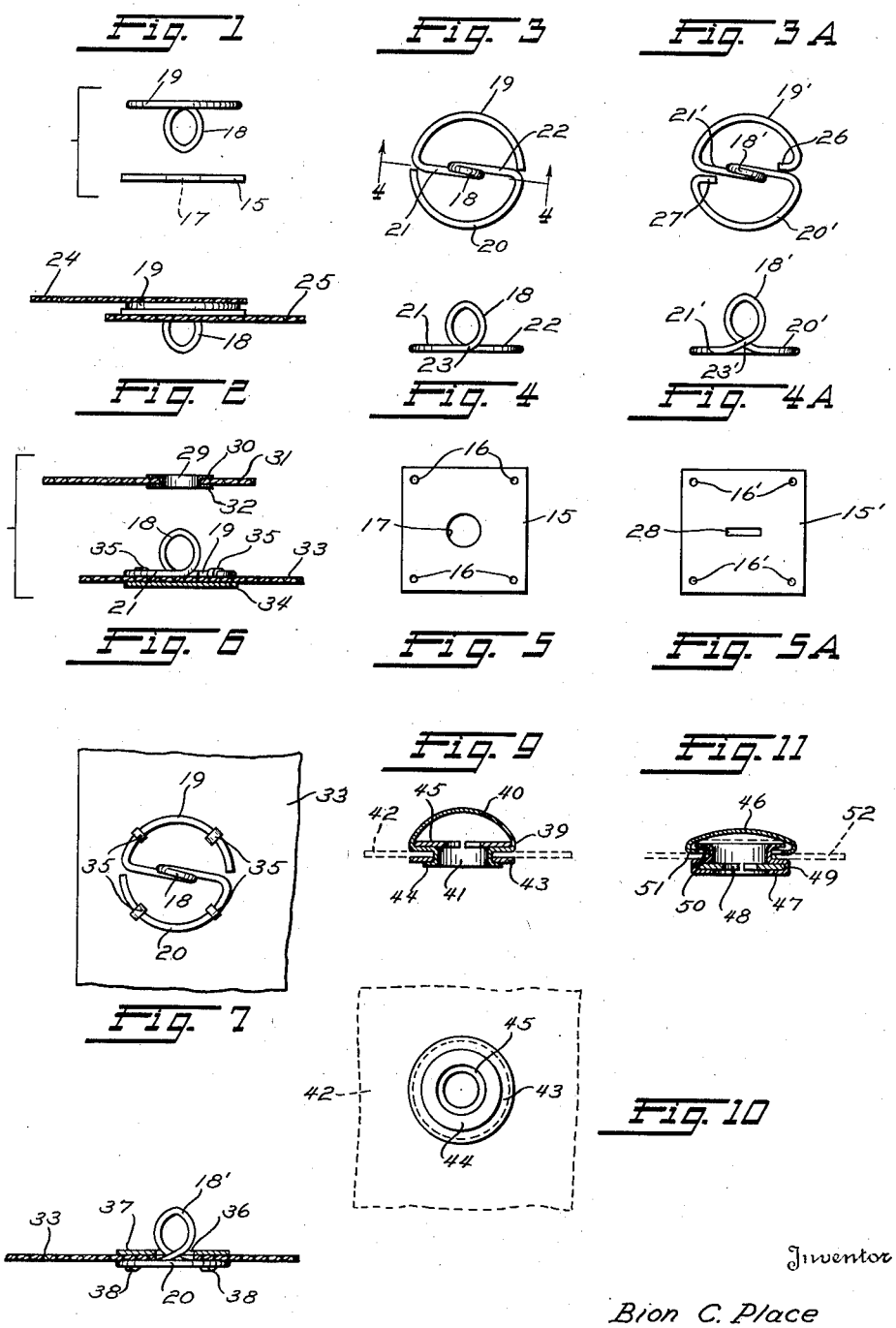
Inventor
Bion C. Place
Strauch & Hoffman
Attorneys Patented July 22, 1941

2,249,910

UNITED STATES PATENT OFFICE 2,249,910

SEPARABLE FASTENER

Bien C. Place, Detroit, Mich., assignor of one-half to George F. Gagnier, Detroit, Mich.

Application February 16, 1938, Serial No. 190,873

5 Claims. (Cl. 24—215)

The present invention relates to separable fasteners for securing together parts of garments, gloves, curtains or the like by snapping one part of the separable fastener into the other part thereof. More particularly, this invention is concerned with a separable fastener for the purpose just stated in which an unusually tenacious engagement is provided between the stud part and the part of the socket member that cooperates therewith.

Separable fasteners, that are in wide use at the present time, provide satisfactory engagement between the parts of the fastener only as long as the mating stud and socket members remain in their original form. Even slight distortion of one of said members, either in use or prior to the application of the fastener parts to the garment or the like results in an unsatisfactory fastening arrangement. Furthermore, even when the stud and socket members are in their original or perfect form and when constructed in the ways that are well known in the art, only a relatively slight holding power is provided between the stud and socket members.

The well recognized difficulties with separable fasteners, as customarily used in the art, are thought to be due in large measure to the fact that the stud part of the fastener engages the wall of the socket member throughout substantially the entire extent of said wall. This requires a stud part that requires contraction, in entering it in the socket member in every direction toward the center of said part. Since it is relatively difficult to contract a metallic stud part in a number of directions at the same time, it is essential that the extent of contraction of the stud part be maintained to a small degree in order to minimize the force necessary to force the stud part into the socket member. In view of this consideration separable fasteners of the type in wide use have limited holding power, because their inherent construction definitely limits the extent of contraction of the stud part to a very small distance.

The primary purpose of the present invention is to provide a separable fastener in which the stud part partakes of an extremely simple form designed to engage the socket member only at two diametrically opposite points, rather than throughout a substantial extent of the wall of the socket member, thus making it possible to design the separable fastener so that the contraction of the stud part may assume a larger amplitude without making it at all difficult to force the stud part in the socket member.

Another object of the invention is to provide a separable fastener, for use in securing garments, gloves, curtains or the like, in which the stud part of the fastener consists only in a single loop constructed of wire and thus provides contact with the socket member only at substantially diametrically opposite points thereof.

A still further object of the invention is to provide a separable fastener consisting of a socket member, that includes a ring, and a stud member, which includes a stud part that is likewise in the form of a ring, said rings being arranged so that when the separable fastener parts are secured together the rings are disposed in planes normal to each other with the one within the other.

Still another object of the invention is to provide an improved stud member for a separable fastener consisting of a stud part formed from one part of a single piece of wire and an attaching part formed from the remainder of said piece of wire, the stud and attaching parts being connected together by cross portions of the wire piece.

Still another object of the invention is to provide an improved socket member for the reception of a stud part consisting only of a wire loop and including a ring part for engagement by the stud part.

Still further objects of the invention will appear as the description thereof proceeds with reference to the accompanying drawing, in which, Figure 1 is a side view of stud and socket members of the present invention shown in separated relation, this figure showing the invention in its simplest form;

Figure 2 is a view of the separable fastener of Figure 1 showing the stud and socket members in engagement and applied to overlapping elements secured together by the fastener;

Figure 3 is a plan view of the stud member looking along the stud part from the end thereof;

Figure 4 is a sectional view taken on the plane indicated by the line 4—4 in Figure 3;

Figure 5 is a plan view of the socket member included in Figures 1 and 2;

Figure 3A is a view corresponding to Figure 3 but disclosing a modified form of stud member;

Figure 4A is a view similar to Figure 4 but showing the modified stud member of Figure 3A;

Figure 5A is a view corresponding to Figure 5 of a modified form of socket member;

Figure 6 is a view illustrating separable elements in which the fastener members have been applied and showing a further way of utilizing the present invention;

Figure 7 is a fragmental view of the lower element of Figure 6 looking along the length of the stud parts secured thereto;

Figure 8 is a fragmental sectional view showing another way of securing the stud member like that included in Figure 6 to one of the elements to be secured by the separable fastener of the present invention;

Figure 9 is a fragmental sectional view of an improved form of socket member that may be used to receive and conceal the stud parts, the elements of which would be secured, being shown in dotted lines;

Figure 10 is a view of the improved socket of Figure 9 looking toward the opening in the socket member;

Figure 11 is a further modified form of socket member shaped to conceal the stud parts and for attachment to a garment, glove or the like without cutting the material thereof.

Like reference characters indicate like parts throughout the several figures.

In the form of the invention illustrated in Figures 1 to 5 inclusive of the drawing, the socket member 15 of the fastener consists simply in a thin sheet metal plate provided with openings 16 to attach it to the garment or the like, and an opening 17 constituting the socket for the reception of the stud part of the stud member.

The stud member is constructed from a single piece of wire, which need not be tempered, by bending the mid-portion of the wire into the form of a loop or ring 18, preferably circular in form. The stud member also comprises an attaching part consisting of the portions 19 and 20 which are formed from the ends of said piece of wire, and together form a substantially closed figure. While in the illustrated embodiment of the invention said figure is a circle it may assume any other convenient form as will be obvious. Stud part 18 is connected to the attaching part of the stud member by portions 21 and 22 which are crossed at 23 so that the stud part 18 in the plane of the attaching part or adjacent to said plane consists of two portions of the piece of wire that extends relatively sharply towards each other at this point.

The separable fastener just described is preferably used in the manner illustrated in Figure 2 of the drawing in which the stud part is attached to a fabric or like elements 24, which extends over another fabric element 25 to which the socket member at 15 is secured. Said members are secured to the elements 24 and 25 preferably by sewing them to the fabric, the stud member by stitching around the portions 19 and 20, and the socket member by stitching through the opening 16 in the body thereof. A slit is cut in the element 25 to permit the passage of the stud part 18 after it has been passed through the opening 17 of the socket member 15.

It will be appreciated that the separable fastener already described is of extremely simple form consisting, of simply a small sheet metal plate and a piece of wire properly bent. Nevertheless, it has been found to be a highly effective separable fastener, the stud part engaging the socket member with considerable tenacity though it is an extremely easy matter to insert the stud part in the socket member. Of course, the external diameter of stud part exceeds the diameter of the opening 17 in the socket member, making it necessary, in entering the stud part in said socket member, to compress the loop to permit the widest portion thereof to pass through the opening. Of course, in compressing the loop it is elongated in a direction away from the attaching portion of the socket member.

The separable fastener of Figures 1 to 4 may be used to take the place of the well known hook and eye, or the well known sheet metal globular-headed snap fasteners frequently used in securing portions of garments together, and when so used it will be understood that the stud part is made as small as possible, a relatively fine untempered wire being found satisfactory for this purpose. Of course, the fastener may be used to secure heavy material together in which event the stud part would be constructed of wire of heavier gauge, the fastener being then adopted to resist considerable force tending to separate the elements secured together by it.

Figures 3A and 4A illustrate a modified form of stud member in which the stud part 18' is in the form of a small letter *l*, as written in script, the point of crossing 23' of the portions 21' and 22', that serve to connect the stud part to the attaching part of the fastener, being disposed substantially above the plane of the attaching part. Viewing Figure 4A, the stud member includes a loop that is spaced some distance from the attaching part providing a stud part that may be used when the socket member is spaced, or when for any reason it is desirable to space the loop, from the element to which the attaching part is secured. Examples of this will presently be described.

The modified form of stud member illustrated in Figures 3A and 4A, preferably, is constructed so that the extreme ends of the wire are bent inwardly toward the center of the attaching portion as indicated at 26 and 27 in Figure 3A, said portions serving to prevent disengagement of the attaching part from the element by turning the fastener beneath the securing means, such as the stitching already described.

The socket member illustrated in Figure 5 may assume the form illustrated in Figure 5A in which, instead of the opening 17, an elongated slot 27 is provided. The length of the slot 28 is made less than the external diameter of the wire stud part, which is intended to be entered in said slot in the same manner as said part is entered in the opening 17 in the form of the invention first described.

Referring to the form of the invention illustrated in Figures 6 and 7 of the drawing the socket member 29 includes simply a grommet having a flange 30 resting against one side of an element 31, and a second flange 32 expanded against the other side of said element. The stud member is attached to the element 33, which is to be secured to the element 31, by means of a disc or ring 34 having a multiplicity of tongues 35 driven through the element 33 and bent around the attaching portion of the stud as clearly illustrated in Figure 7, which form of the invention is preferred when it is desired to secure curtain portions such as automobile curtains together in overlapped relation. When so used, of course, the stud part 18 is forced into the grommet 29, the internal diameter of which is less than the maximum transverse width of the stud 18. In this form of the invention the stud members are preferred having a stud part in the shape of a small letter *l*, written in script, rather than that illustrated in Figures 1, 2, 3 and 4 inasmuch as these figures illustrate an example in which it is desirable to space the holding shoulder provided by the stud from the element to which it was secured.

Referring to Figure 8 of the drawing, a modified way of securing the stud member to the element 33 is illustrated. In this form of the invention, said element is provided with an opening 36 through which the stud part 18 is passed until the attaching portions 19 and 20 of the stud fastener bear against one side of the element 33. An attaching means in the form of a ring 37 is then applied to the other side of the element 33, said ring carrying a multiplicity of tongues 38 which are driven through the element 33 and bent around the retaining portions of the stud member.

Referring to Figures 9 and 10, a modified form of socket member is illustrated consisting of a casing 39 having a portion 40 designed to house the stud part of the cooperating separable fastening member and a sleeve-like extension 41 to enter an opening in an element to which the socket member is to be secured. Such an element 42 is illustrated in dotted lines in said figures. After the sleeve-like extension 41 is entered in the opening in said element 42, a washer 43 is telescoped on the end of said extension 41. Then the extreme end of said extension is spun or expanded outwardly, as indicated at 44, to secure the socket member to the element 42. A ring 45 preferably split is inserted in the casing so as to provide a shoulder for engagement with the stud member, which, preferably, assumes the form illustrated particularly in Figures 3A and 4A of the drawing, with the stud part designed to provide the holding shoulder at the appropriate point.

Referring to Figure 11, a further modified form of socket member is disclosed consisting of three parts, a casing part 46; a body part 47, and a ring 48, preferably split, the ring 48 being seated in a groove 49 formed in the body member 47, as illustrated in the drawing. Said body member also includes an outwardly turned flange 50 to which the casing part 46 is secured by bending the margins 51 thereof around the flange 50 in spaced relation thereto.

The socket member just described is used, when it is desired to attach a socket member to an element, such as the element indicated in dotted lines 52 of Figure 11, without forming an opening or hole therein. The body portion 47 is applied to one side of said element and the casing part 46 to the other side after which the margins 51 are turned inwardly around the flange 50 with a portion of the flexible element 52 disposed therebetween and clamped between flange 50 and inwardly bent margins 51. Of course, the stud part of the cooperating stud member is engaged with the shoulder provided by the ring 48 seated in the groove 49 of the body member 47. A stud member consisting of a single loop of wire of the kind already described is preferred as the stud part intended to cooperate with the socket member just described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A separable fastener for garments or the like consisting of a socket member presenting an unyielding circular wall for the reception of the stud part of a stud member, and a stud member constituting a single piece of wire and including a single yielding ring-like stud part formed from the mid-portion of said piece of wire to a diameter sufficiently small to be usable in fastening garments or the like and exceeding slightly the diameter of the opening formed by said circular wall, and constituting the complete stud part, and means to attach the stud member to the element to be secured by it comprising the ends of said piece of wire, said ends each forming one-half of a geometrical figure disposed in a plane normal to the plane of said stud part.

2. A separable garment or like fastener, consisting of a socket member providing an opening for the stud part of a stud member, means to secure said socket member to a part of said garment or the like and a stud member constructed entirely of a single piece of wire, and having an entering or stud part consisting solely in a substantially circular wire loop of a diameter sufficiently small to be usable in fastening garments and slightly exceeding the diameter of said opening, and attaching means to secure said stud member to another part of the garment or the like consisting of the ends of said piece of wire arranged to secure the stud member so that the stud or entering part is disposed perpendicular to the garment or the like when it is secured thereto, said entering or stud part being expansible and contractible so as to provide a snap fastener engagement with said socket member.

3. A garment or like fastener, consisting of a socket member and a stud member including an expansible and contractible stud part to enter the socket in said first named member, said stud part consisting solely of a substantially circular wire ring, the portions of the wire from which said ring is formed being crossed and then shaped to provide means to attach said stud member to a garment or like part, said ring having an external diameter which slightly exceeds the internal diameter of said socket.

4. A stud member for use as a part of a garment or like fastener, consisting of an expansible and contractible wire stud part in the form of a single substantially circular loop constructed from the mid-portion of a piece of wire and having a diameter sufficiently small to provide a usable garment or like stud part, and an attaching part constructed of the end portions of said piece of wire, the attaching part constituting a substantially closed figure, said loop being connected to said attaching part by two crossed portions of said piece of wire.

5. A separable fastener, comprising a socket member, and a stud member consisting in an expansible and contractible stud part to enter said socket member, said stud part including only a single wire loop of substantially circular form, said stud member also including a wire attaching part integral with said loop and connected to said loop by integral crossed wire portions.

BION C. PLACE.